United States Patent [19]
Lee

[11] Patent Number: 5,519,919
[45] Date of Patent: May 28, 1996

[54] RETRACTABLE HANDLE ASSEMBLY

[76] Inventor: Rui-Ming Lee, 58, Ma Yuan West St., Taichung, Taiwan

[21] Appl. No.: 353,688

[22] Filed: Dec. 12, 1994

[51] Int. Cl.⁶ .................................................. B62B 1/12
[52] U.S. Cl. ....................... 16/115; 248/171; 280/655; 280/47.2; 280/47.27
[58] Field of Search .................. 280/37, 655, 655.1, 280/47.2, 47.27, 47.28, 47.29; 16/111 R, 115; 248/129, 166, 171

[56] References Cited

U.S. PATENT DOCUMENTS

| | | | |
|---|---|---|---|
| 4,256,320 | 3/1981 | Hager | 280/37 |
| 4,258,826 | 3/1981 | Murray | 280/47.28 X |
| 4,867,438 | 9/1989 | Steckert et al. | 280/47.2 X |
| 4,887,835 | 12/1989 | Dallaire et al. | 280/655 X |
| 5,127,664 | 7/1992 | Cheng | 280/655 |
| 5,409,253 | 4/1995 | Cheng | 280/DIG. 6 X |

*Primary Examiner*—Margaret A. Focarino
*Assistant Examiner*—Michael Mar

[57] ABSTRACT

A handle includes two rods slidably engaged in two tubes each having two openings formed in the upper and lower portions. A earth is engaged in the lower portion of one of the rods and has a projection engaging through the orifice for engaging with either of the openings. A pawl is pivotally coupled to the rod for disengaging the projection from the openings. A button has a column for engaging with the pawl and for moving the catch in order to disengage the projection from the openings. A frame is pivotally coupled to the tubes and movable out of the tubes for carrying objects.

5 Claims, 4 Drawing Sheets

RETRACTABLE HANDLE ASSEMBLY

BACKGROUND OF THE INVENTION

1. Field of the Invention

The present invention relates to a handle, and more particularly to a retractable handle assembly for push cars or for suitcases.

2. Description of the Prior Art

Typical push cars or suitcases comprise a retractable handle assembly including two rods slidably engaged in two tubes. The rods may be secured to the tubes at an extended position and a retracted position. However, normally, an additional tool is required to release or to engage the rods with the tubes so as to control the operation of the handle assembly.

The present invention has arisen to mitigate and/or obviate the afore-described disadvantages of the conventional retractable handle assemblies.

SUMMARY OF THE INVENTION

The primary objective of the present invention is to provide a retractable handle assembly which can be easily operated and which includes a greatly simplified configuration.

In accordance with one aspect of the invention, there is provided a retractable handle assembly comprising two tubes including an upper portion and a lower portion, a first of the tubes including an opening formed therein, two rods slidably engaged in the tubes and each including a lower portion, the lower portion of a first of the rods including an orifice formed therein for aligning with either of the openings, a catch engaged in the lower portion of the first rod and including a projection engaging through the orifice for engaging with either of the openings, means for biasing the projection to engage with the openings, a pawl including a first end pivotally coupled to the lower portion of the first rod and a second end for engaging with the catch and for forcing the catch against the biasing means, a button engaged on top of the first rod and including a column extended downward for engaging with the pawl and for actuating the pawl, the catch being forced against the spring in order to disengage the projection from the openings when the pawl is rotated by the column and when the button is depressed, the rods being freely movable in the tube when the projection is disengaged from the openings.

A cap is engaged in the lower portion of the first rod and includes an aperture for aligning with the orifice and the openings, the catch is engaged in the cap and the projection is engaged through the aperture and the orifice, the pawl is pivotally coupled to the cap and is located above the catch.

A frame includes two legs having an upper portion pivotally coupled to the upper portions of the tubes, the legs each including an inclined groove formed therein, the tubes each including a slot longitudinally formed therein, the lower portions of the rods each including a guide means extended through the slots for engaging with the inclined grooves of the legs, the inclined grooves each including a lower portion and an upper portion, the frame being moved toward the tubes when the guide means are engaged in the lower portions of the inclined grooves and the frame being moved away from the tubes when the guide means are engaged in the upper portions of the inclined grooves.

Two caps are engaged in the lower portions of the rods, the guide means being secured to the caps for slidably engaging with the inclined grooves.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
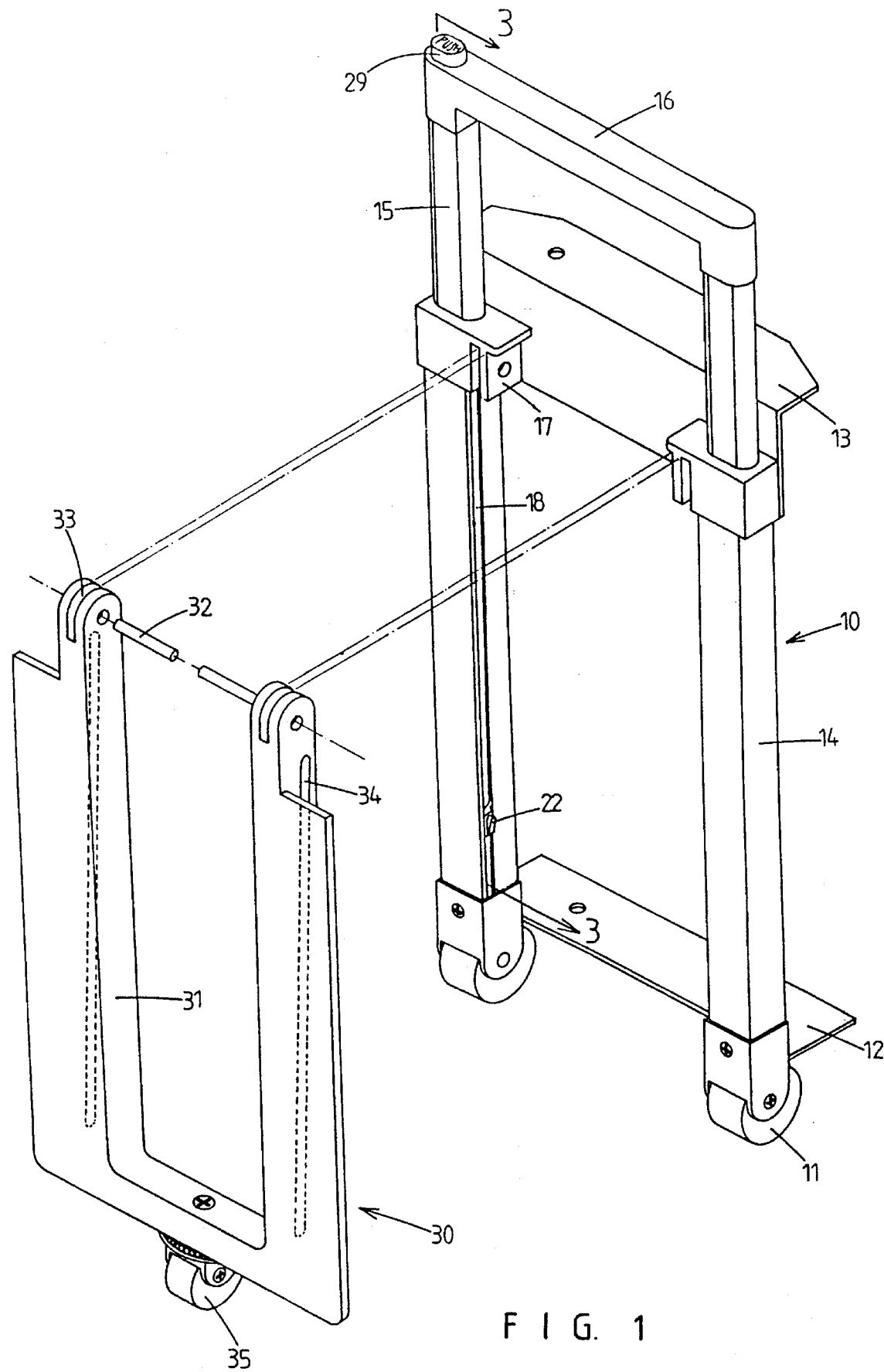
FIG. 1 is an exploded view of a retractable handle assembly in accordance with the present invention.

Referring to the drawings, and initially to FIG. 1, a retractable handle assembly in accordance with the present invention is generally indicated with reference numeral 10 and comprises two wheels 11 and two brackets 12, 13 for securing to a push car or a suitcase so as to move the push car or the suitcase. The handle assembly 10 includes two tubes 14 and two rods slidably engaged in the tubes 14 respectively. A hand grip 16 is secured on top of the rods 15. The upper ends of the tubes 14 each includes a flange 17 depended thereon.

Figure 2:
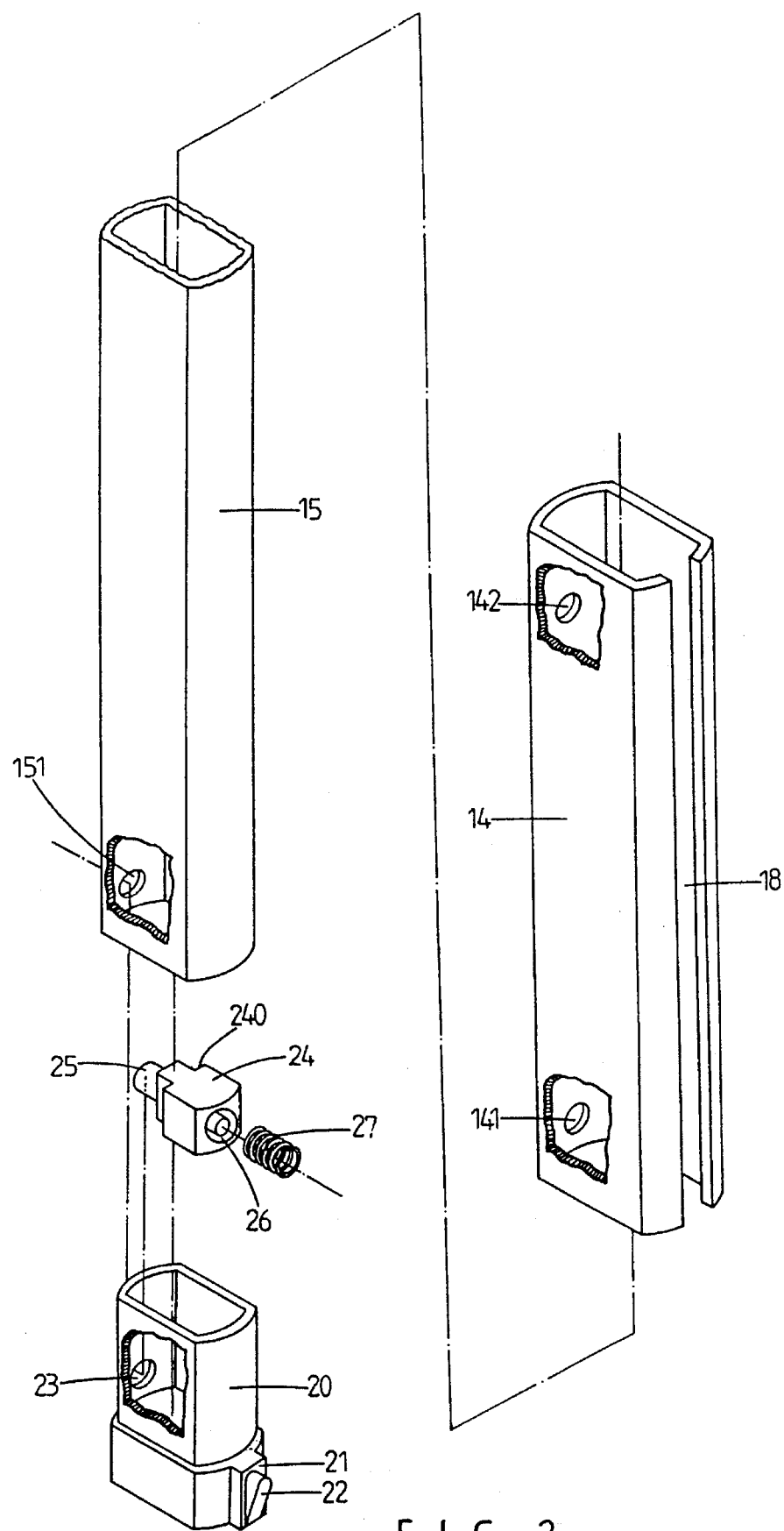
FIG. 2 is a partial exploded view of the retractable handle assembly.

Referring next to FIGS. 2 and 3, and again to FIG. 1, the tubes 14 each includes a slot 18 longitudinally formed therein, and two openings 141, 142 formed in the lower portion and in the upper portion respectively. The rods 15 each includes an orifice 151 formed in the bottom portion for aligning with the openings 141, 142. Two caps 20 are engaged in the bottom portion of the rods 15 and each includes an aperture 23 for aligning with the orifices 151 and the openings 141, 142. The caps 20 each includes a block 21 slidably engaged in the slots 18 and a guide 22 extended outward through the slots 18. A catch 24 is engaged in one of the caps 20 and includes a projection 25 extended through the aperture 23 and the orifice 151 for engaging with either of the openings 141, 142 so as to position the rods 15 relative to the tubes 14 at an extended position and a retracted position. The catch 24 includes a cavity 26 formed therein distal to the projection 25 for engaging with a spring 27, the spring 27 is biased against the cap 20 for biasing the projection 25 to engage with either of the openings 141, 142 of the tube 14. The catch 24 further includes a shoulder 240 formed therein.

Figure 3:
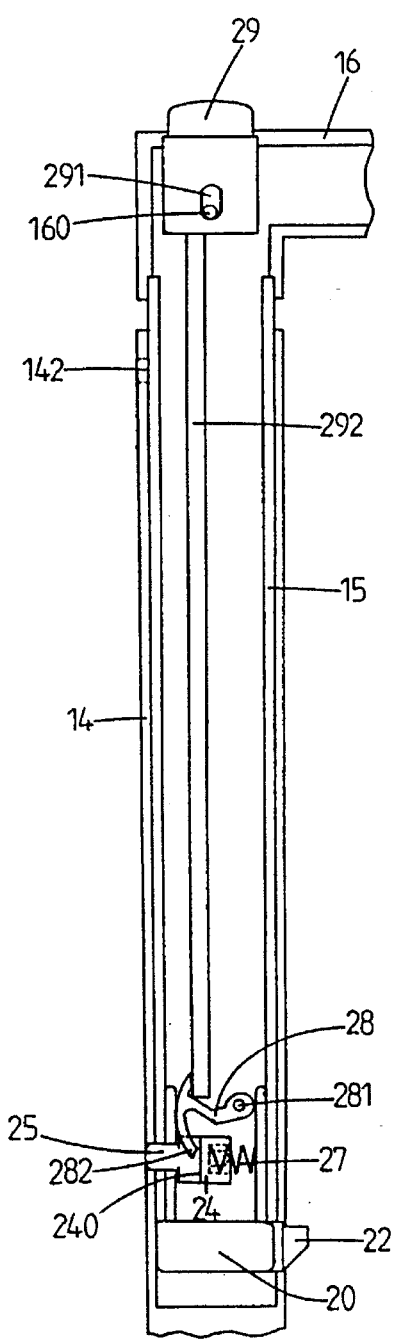
FIGS. 3 and 4 are cross sectional views taken along lines 3—3 of FIG. 1.
Figure 4:
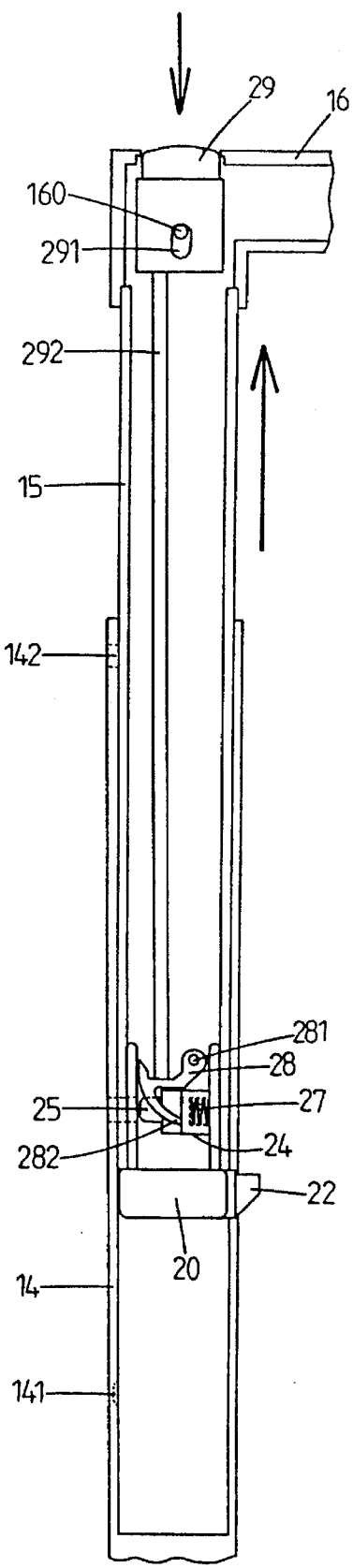

As best shown in FIGS. 3 and 4, a pawl 28 includes one end pivotally coupled to the cap 20 at a pin 281 and a tip 282 formed in the other end for engaging with the shoulder 240 of the catch 24. The catch 24 may be forced against the spring 27 when the pawl 28 is rotated about the pin 281. A button 29 includes an oblong hole 291 slidably engaged on a pin 160 which is secured on top of the rod 15 such that the button 29 may move upward and downward. A column 292 is extended downward from the button 29 and includes a bottom end for contacting with the pawl 28 and for rotating the pawl 28.

In operation, as shown in FIG. 3, the button 29 and the column 292 may be pushed upward by the pawl 28 when the catch 24 is biased By the spring 27. At this moment, the projection 25 of the catch 24 may be forced to engage with either of the openings 141, 142 of the tube 14. As shown in FIG. 4, when the button 29 is depressed, the pawl 28 is actuated to force the catch 24 against the spring 27 in order to disengage the projection 25 from the openings 141, 142. At this moment, the rods 15 may slide freely in the tubes The projection 25 may be forced to engage with either of the openings 141, 142 again when the button 29 is released and when the projection 25 is aligned with either of the openings 141, 142.

Referring next to FIG. 5, and again to FIG. 1, the handle assembly 10 further includes a frame 30 having two legs 31 and having a wheel 35 provided on the bottom thereof. The legs 31 each includes a indentation 33 for engaging with the flanges 17, and two pin elements 32 engage through the upper ends of the legs 31 and the flanges 17 so as to pivotally couple the frame 30 to the tubes 14. The legs 31 each includes an inclined groove 34 formed therein for engaging with the guides 22.

Figure 5:
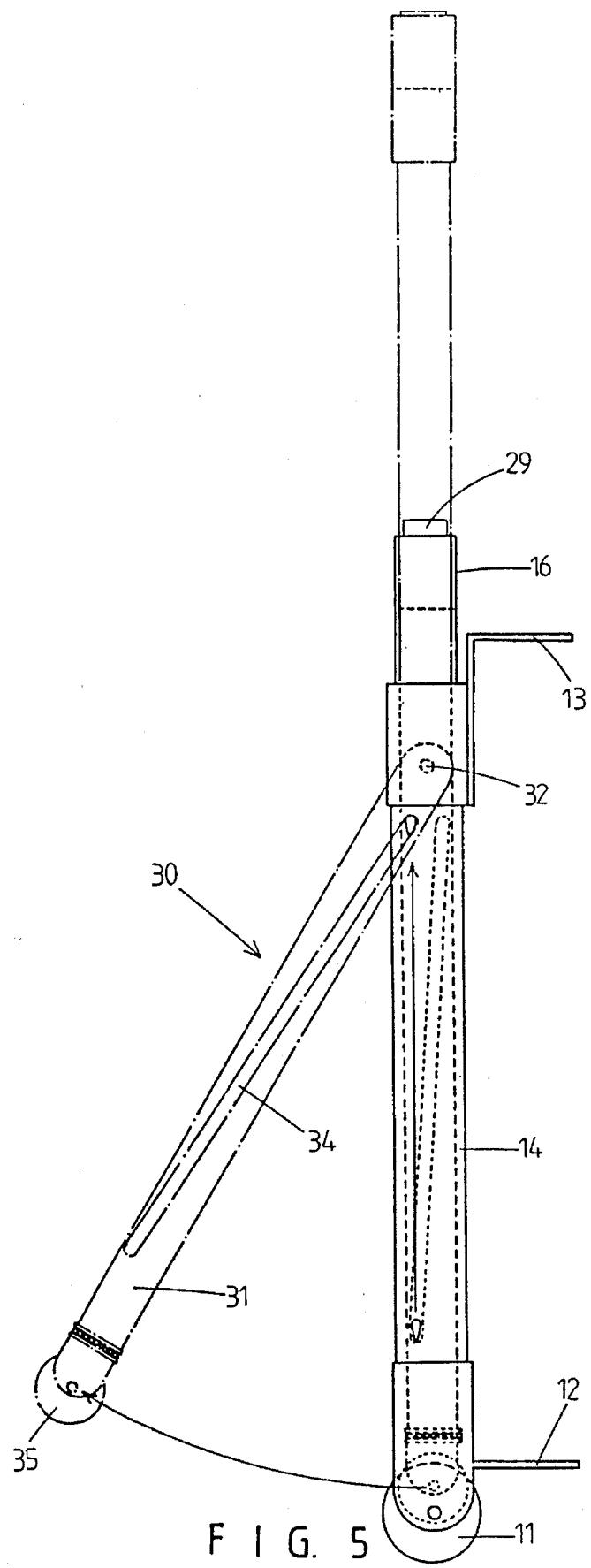
FIG. 5 is a plane schematic view illustrating the operation of the retractable handle assembly.

As shown in FIG. 5, when the rods 15 are retracted in the tubes 14, i.e., the guides 22 move to the bottom portion of the grooves 34, the frame 30 is retracted to a retracted position in parallel to the tubes 14. When guides 22 move upward to the upper portions of the grooves 34, the frame 30 is forced outward of the tubes 14 such that the wheels 11, 35 form a plane and the frame 30 and the tubes 14 form a stably structure for carrying objects.

Accordingly, the retractable handle assembly in accordance with the present invention includes a greatly simplified configuration that can be easily operated. It is only required to depress the button 29 in order to operate the retractable handle assembly.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A handle assembly comprising:

two tubes including an upper portion and a lower portion, a first of said tubes including an opening formed therein, two rods slidably engaged in said tubes and each including a lower portion, said lower portion of a first of said rods including an orifice formed therein for aligning with either of said openings, a catch engaged in said lower portion of said first rod and including a projection engaging through said orifice for engaging with either of said openings, a spring biasing said projection to engage with said openings, a pawl including a first end pivotally coupled to said lower portion of said first rod and a second end for engaging with said catch and for forcing said catch against said spring, a button engaged on top of said first rod and including a column extended downward for engaging with said pawl and for actuating said pawl, said catch being forced against said spring in order to disengage said projection from said openings when said pawl is rotated by said column and when said button is depressed, said rods being freely movable in said tube when said projection is disengaged from said openings, a cap engaged in said lower portion of said first rod and including an aperture for aligning with said orifice and said openings, said catch being engaged in said cap and said projection being engaged through said aperture and said orifice, said pawl being pivotally coupled to said cap and located above said catch, a frame including two legs having an upper portion pivotally coupled to said upper portions of said tubes, each of said legs including an inclined groove formed therein, each of said tubes including a slot longitudinally formed therein, each of said lower portions of said rods including a guide means extending through said slots for engaging with said inclined grooves of said legs, each of said inclined grooves including a lower portion and an upper portion, said frame being pivotally moved toward said tubes when said guide means are moved into engagement with said lower portions of said inclined grooves and said frame being pivotally moved away from said tubes when said guide means are moved into engagement with said upper portions of said inclined grooves, and said guide means being secured to said cap for slidably engaging with said inclined grooves.

2. A handle assembly comprising:

two tubes including an upper portion and a lower portion and each including a slot longitudinally formed therein, two rods slidably engaged in said tubes and each including a lower portion having a guide means extending through said slots, a frame including two legs having an upper portion pivotally coupled to said upper portion of said tubes, said legs each including an inclined groove formed therein, said inclined grooves each including a lower portion and an upper portion, said guide means being extended through said slots for engaging with said inclined grooves of said legs, said frame being pivotally moved toward said tubes when said guide means are moved into engagement with said lower portions of said inclined grooves and said frame being pivotally moved away from said tubes when said guide means are moved into engagement with the upper portions of said inclined grooves.

3. A handle assembly according to claim 2 further comprising two caps engaged in said lower portions of said rods, said guide means being secured to said caps for slidably engaging with said inclined grooves.

4. A handle assembly according to claim 2, wherein said upper portion and said lower portion of a first of said tubes each includes an opening formed therein, said lower portion of a first of said rods includes an orifice formed therein for aligning with either of said openings, said handle assembly further comprises a catch engaged in said lower portion of said first rod and including a projection engaging through said orifice for engaging with either of said openings, a spring biasing said projection to engage with said openings, a pawl including a first end pivotally coupled to said lower portion of said first rod and a second end for engaging with said catch and for forcing said catch against said spring, a button engaged on top of said first rod and including a column extended downward for engaging with said pawl and for actuating said pawl, said catch is forced against said spring in order to disengage said projection from said openings when said pawl is rotated by said column and when said button is depressed, said rods are freely movable in said tube when said projection is disengaged from said openings.

5. A handle assembly according to claim 4 further comprising a cap engaged in said lower portion of said first rod and including an aperture for aligning with said orifice and said openings, said catch being engaged in said cap and said projection being engaged through said aperture and said orifice, said pawl being pivotally coupled to said cap and being located above said catch.

* * * * *